United States Patent
Flesch et al.

[15] 3,662,644
[45] May 16, 1972

[54] WALL PLUG ASSEMBLY, PARTICULARLY FOR AFFIXING FACINGS

[72] Inventors: Friedrich Flesch, Emmendingen; Hansjorg List, Waldkirch, both of Germany

[73] Assignee: Hilti Aktiengesellschaft, Schaan, Liechtenstein

[22] Filed: June 30, 1970

[21] Appl. No.: 51,182

[30]     Foreign Application Priority Data

July 1, 1969    Germany......................P 19 33 313.2

[52] U.S. Cl......................................85/69, 52/378, 52/383, 52/713, 85/84
[51] Int. Cl..........................................................F16b 13/06
[58] Field of Search....................85/69, 67, 84, 83, 73, 74, 85/63; 52/378, 512, 513, 351, 362, 383, 509, 703, 713; 287/189.36 F, 103 R, 115

[56]           References Cited

UNITED STATES PATENTS 3,471,183  10/1969   Fischer....................................85/84 X
2,871,749   2/1959   Kalb............................................85/84
3,522,756   8/1970   Von Wolff.............................85/84 X

FOREIGN PATENTS OR APPLICATIONS 280,322   1/1965   Australia...................................85/67

*Primary Examiner*—Ramon S. Britts
*Attorney*—David Toren and Bernard X. McGeady

[57]           ABSTRACT

A wall plug assembly, particularly for affixing facings, comprising the actual "dowel" or plug itself, a securing screw, an extension shank and an expanding sleeve for the latter. The plug, in a zone not capable of being expanded, and/or in the extension shank are respectively is provided with at least one thrust bearing for the purpose of fixing the securing screw in its axial position.

6 Claims, 6 Drawing Figures

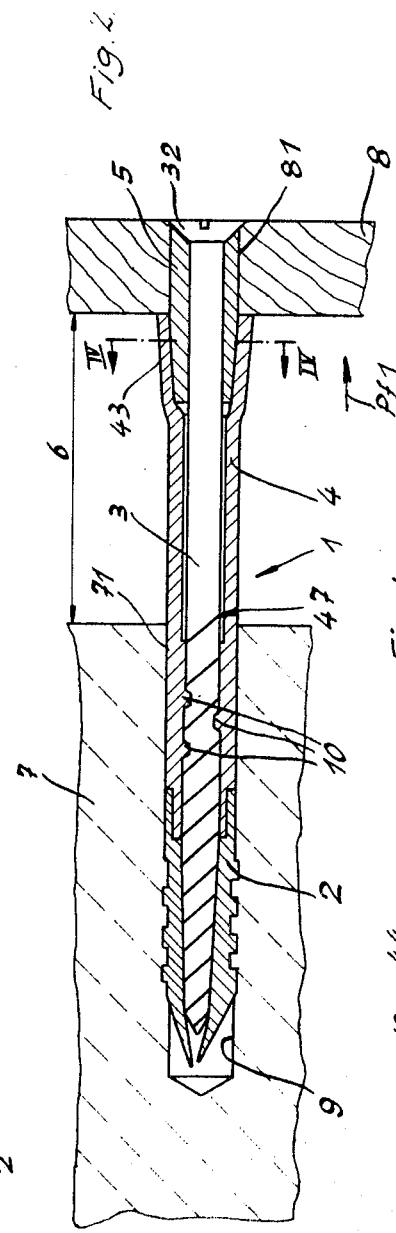

INVENTORS:
FRIEDRICH FLESCH
HANSJÖRG LIST
By: Michael S. Striker
Attorney 3,662,644

WALL PLUG ASSEMBLY, PARTICULARLY FOR AFFIXING FACINGS

BACKGROUND OF THE INVENTION

This invention relates to plugs, and more specifically to a wall plug assembly, particularly for affixing facings, consisting of the actual "dowel" or plug itself, a securing screw, an extension shank and an expanding sleeve for the latter.

In many cases a plug, before being inserted in a wall, is combined with its securing screw and with any further parts to form an assembly, for which purpose the securing screw is screwed to a certain distance into the sleeve-like part of the plug. As a rule this system involves serious drawbacks, among them being the fact that the plug is expanded to some extent in advance. This makes it more difficult to insert the plug and also to recover it and readjust it to the required axial position.

SUMMARY OF THE INVENTION

It is the object of the present invention to provide a wall plug assembly, particularly for affixing facings, which will make it possible, without the disadvantages of the plug assemblies hitherto known, to insert the plug and then adjust it in the axial direction without difficulty, also facilitating, in particular, the task of withdrawing the plug after it has been inserted.

To attain this object the present invention provides a plug assembly, particularly for affixing facings, which comprises a plug having a forward portion provided with an elongated axial slit, and a sleeve-shaped non-spreadable rear portion through which a central axial opening extends; an extension shank having an internal bore and one of its ends constructed so that it is insertable in said rear portion of said plug; an expanding sleeve insertable in the other end of the extension shank; a securing screw adapted to be passed through said expanding sleeve, said extension shank and said rear portion of the plug into the forward portion thereof, and at least one thrust bearing of limited length provided at a position between the forward end of the rear portion of the plug and said other end of the extension shank for the purpose of axially fixing the securing screw in screwed-in position.

BRIEF DESCRIPTION OF THE DRAWING

The invention will now be described by way of example and with reference to the accompanying drawing, in which:

FIG. 1 is an exploded side view of a plug assembly according to the invention, the appertaining securing screw being not shown;

FIG. 2 is a longitudinal section through a wall, a facing plate for said wall and the plug assembly connecting said facing plate to said wall;

FIG. 3 is a longitudinal section through a detail marked III in FIG. 1 and showing the front end of the extension shank of the plug;

FIG. 4 is a cross section through the mounted plug assembly on the line IV—IV of FIG. 2, and FIG. 5 is a longitudinal cross section through the extension shank connected to the plug, the securing screw having been inserted in advance;

DESCRIPTION OF THE PREFERRED EMBODIMENT

Figure 6:
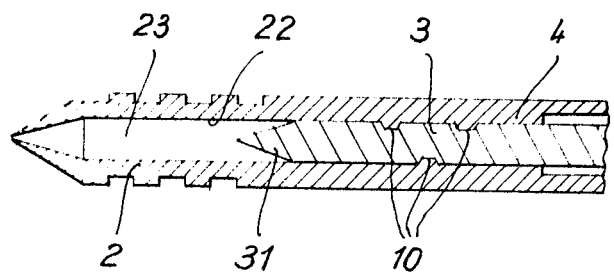
FIG. 6 is a longitudinal cross section through the plug and extension shank, wherein said plug and said shank are formed integral.

FIGS. 1 and 2 show a wall plug assembly indicated generally by the reference numeral 1 and consisting of the actual dowel or plug 2, a securing screw 3, an extension shank 4 and an expanding sleeve 5 behind the extension shank 4 (FIG. 2). Plug assemblies of this kind serve in particular for affixing a facing plate 8 to a wall 7 at a certain distance 6 from the latter. The plug 2, the extension shank 4 and the expanding sleeve 5 usually consist of plastics, although in special cases other materials such as metal can be used. The plug 2 is an ordinary commercial straddling dowel which has an elongated axial slit 23 in its forward position. The rear portion 21 of the plug 2 is sleeve-shaped, non-spreadable and has a central axial opening 22 for the introduction therein of the securing screw 3 and of the forward end of the extension shank 4. This latter is an independent part of which the forward end comprises an insertion zone 41 of reduced diameter which bears two detents 42 situated opposite to each other and extending radially outwardly. These detents 42, together with the insertion zone 41, are adapted to the central axial opening 22 and the slit 23, so that the extension shank 4 can be inserted in the sleeve-like rear portion of the plug 2 and the detents 42 assume a fixed position in the slit 23. The plug 2 and the extension shank 4 then form one single unit, as may be seen from FIG. 2. The detents 42 may be replaced by the use of an adhesive between the plug 2 and the extension shank 4, or this adhesive connection can be adopted in conjunction with them. If desired, the plug 2 may be made in one piece with its extension shank 4. It is usually of advantage, however, for the plug 2 and the extension shank 4 to be made in two separate parts, as the thrust bearing, which is required in the extension shank and which will still be described in greater detail, can then be produced more easily. The desirability of providing said thrust bearing in the extension shank 4 instead of in the plug itself is likewise due to the greater ease with which the thrust bearing can then be produced.

The rear end of the extension shaft 4 is provided with a stop collar 43 which possesses a certain radial elasticity and of which the outer contour projects to some extent beyond the external diameter D of the extension shank 4. This diameter D also corresponds to the diameter of an insertion bore 81 provided in the facing plate 8 and to the external diameter of the sleeve-like rear portion 21 of the plug 2. By the aid of weakened portions 431 provided in the stop collar 43 (FIGS. 1 and 4) and also as a result of the somewhat conical shape of the latter, tapering towards the front end of the plug, the stop collar can be passed without difficulty, despite its increased external diameter, through the insertion bore 81 in the facing plate 8, so long as the expanding sleeve 5 has not yet engaged the extension shank 4.

The non-spreadable rear portion 21 of the plug 2 and/or the extension shank 4 is provided with a screw-threaded portion 10 forming a thrust bearing of limited length for the securing screw 3. This screw-threaded portion 10 is situated in the immediate vicinity of the insertion zone 41 of the extension shank 4. A thickened wall 44 (FIG. 3 and 5) is provided in the zone of this screw-threaded portion 10 of the extension shank 4, thus improving the conditions as regards space, facilitating the production of the parts and increasing their strength.

As may also be seen from FIG. 5, the internal diameter of the central axial opening 22 of the plug 2, the external contour of the securing screw 3 and the position of the screw-threaded portion 10, as well as the position of the parts surrounding it, are adapted to one another the following points of view having been taken in consideration:

The internal diameter $d$ at the narrowest point 47 of the extension shank 4 enables the securing screw 3 to be screwed in without difficulty, just as the central bore 45 of the extension shaft 4 altogether facilitates the introduction of the screw 3 having a slightly greater diameter $d1$ than the diameter $d$, at all events in its original state, before undergoing deformation. The screw-threaded portion 10 or a similar thrust bearing also acts in a zone where there is no longer any noticeable tapering of the threaded parts of the securing screw when the point 31 of the latter is firmly in position in the central axial opening 22 of the plug. At this stage the front end of the securing screw 3 does not yet act on the plug 2 in such a way as to cause it to expand or spread but merely guides it and holds it in position.

The procedure adopted in producing and affixing the wall plug assembly 1 proposed by the invention is as follows:

Except in special cases where the plug 2 and its extension shank 4 are made in one piece, they are first of all placed one inside the other and interconnected either by means of the detents 42 or with the use of an adhesive and possibly by both methods together. The expanding sleeve 5 is then placed on the rear end of the extension shank 4 and the securing screw 3 passed through the central bores 55 and 45 of the expanding sleeve 5 and of the extension shank 4. When the securing screw 3 encounters a resistance during this insertion in the axial direction as a result of the screw-threaded portion 10, it is screwed in gently until a slight resistance is noticed. This indicates that the front end of the securing screw 3 has come to rest against its abutment in the central axial opening 22 of the plug 2. The plug assembly 1 has thus been preliminarily mounted, and it can be introduced through the bore 81 in the facing plate 8 into the dowel hole 9 in the wall 7. The expanding sleeve 5 should then be at a certain distance from the extension shaft 4, so that the stop collar 43 on the rear end of the extension shank 4 can be adapted without difficulty to the diameter D of the bore 81. In most cases the plug assembly, when being pressed through the bore 81, penetrates the dowel hole 9 somewhat too deeply, and it can then be withdrawn in the direction shown by the arrow Pf 1, by the aid of the securing screw 3, until the stop collar 43, which has expanded elastically, comes to rest against the back side of the facing plate 8, as shown in FIG. 2. The securing screw 3 and the expanding sleeve 5 are then moved into the position shown in FIG. 2. A cone 51 formed by the leading end of the expanding sleeve 5 fixes the stop collar 43 in its spread position, so that the facing plate 8, between the stop collar 43 and the head 32 of the securing screw 3, is also fixed in position, in the axial direction of the plug assembly 1. The securing screw 3 is screwed in, thus securing the plug 2 in the dowel hole 9 in the usual manner.

The wall plug assembly proposed by the invention, while comparatively inexpensive to produce and simple to use, also renders the operation of wall plug assemblies considerably easier.

In the assembled position (FIG. 5) the securing screw 3 may be inserted in such a way as to secure itself to a somewhat greater extent and cut into the non-expansible zone of the plug 2, so that the screw 3 will likewise contribute to a still firmer connection between the plug 2 and the extension shank 4.

All the foregoing features may be essential to the invention either independently of one another or in any desired combination.

When the internal diameter of the central axial opening 22 of the plug 2, the external contour of its screw 3, the position of the screw-threaded portion 10 and also the part surrounding it (cf. FIGS. 3 and 5) are suitably adapted to one another, this will ensure that the screw 3, in the assembled position, will support the insertion zone 41 from the inside and possibly press it to some extent against the central axial opening 22 of the plug 2, in the radial direction. This improves the connection between the plug 2 and the extension shank 4 and, in particular, enables the detents 42 to be held more firmly in their positively locked position in the elongated axial slit 23 of the plug 2.

The invention may be embodied in other specific forms without departing from the spirit or essential characteristics thereof. The embodiment is therefore to be considered in all respects as illustrative and not restrictive.

What is claimed is:

1. A wall plug assembly, particularly for affixing facings to a support, comprising an expansion plug having a forward portion provided with an elongated axial slit, and a sleeve-shaped non-spreadable rear portion having a central axial opening of predetermined dimensions; a discrete extension shank having an internal bore and two ends one of which is dimensioned to be matingly insertable into said opening a at said rear portion of said plug, and the other of which is radially expandable; means for retaining said one end of the extension shank within said opening; an expanding sleeve insertable into said other end of the extension shank; a securing screw having a leading end and being adapted to be passed through said expanding sleeve, extension shank and rear portion of the plug and to a requisite expansion depth into said forward portion thereof for expanding the same; said securing screw having engaging means on the shank thereof; and at least one thrust bearing within the internal bore of said extension shank adapted for engaging said means on said securing screw and axially retaining said securing screw and being rearwardly spaced from said forward portion of said plug by such a distance that on engagement of said securing screw by said thrust bearing said leading end is lodged in said plug only to a pre-expansion depth.

2. A wall plug assembly in accordance with claim 1, wherein said thrust bearing is formed by an internal screwthread.

3. A wall plug assembly in accordance with claim 1, wherein said thrust bearing is situated in the vicinity of said one end of said extension shank.

4. A wall plug assembly in accordance with claim 1, comprising cooperating connecting means on said extension shank and said plug.

5. A wall plug assembly in accordance with claim 1, wherein said one end of the extension shank is of reduced diameter and provided with detents to engage in the axial slit in the plug, and wherein the extension shank has a thickened wall portion which is arranged in the immediate vicinity of said one end and provided with said thrust bearing.

6. A wall plug assembly in accordance with claim 1, wherein the respective internal passages of the extension shank and the thrust bearing are so dimensioned in relation to the securing screw that said screw can be screwed into the extension shank without the exertion of any appreciable force.

* * * * *